Nov. 1, 1927.  
F. S. PENN  
SWIVEL SNARE TRIGGER  
Filed May 16, 1927
1,647,578
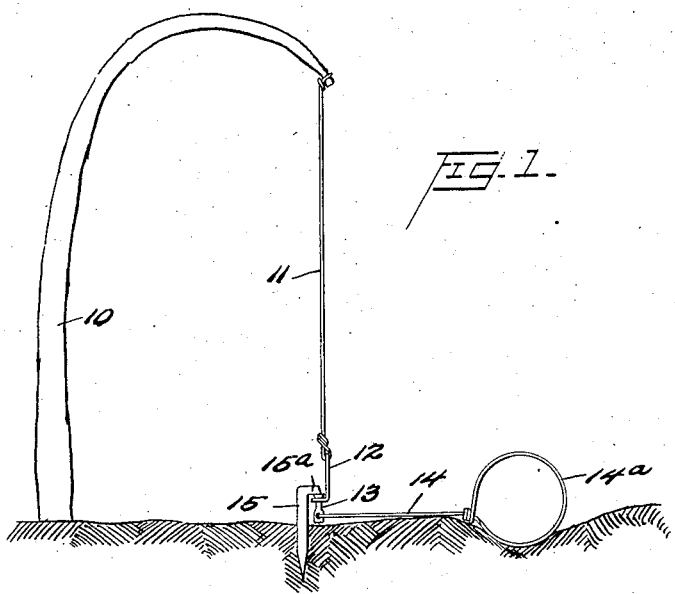
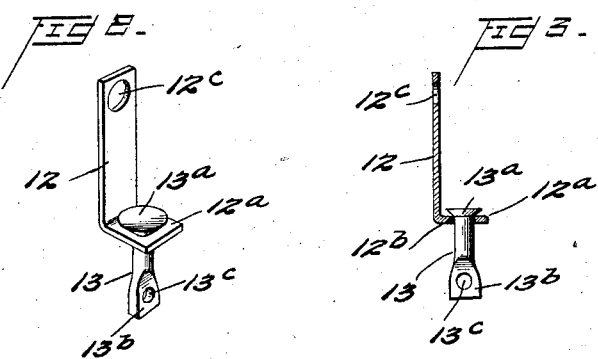
Inventor  
Francis S. Penn,  
By Watson, Coit, Morse & Grindle.  
Attorney Patented Nov. 1, 1927.

1,647,578

UNITED STATES PATENT OFFICE.

FRANCIS SNOWDEN PENN, OF TALBOT COUNTY, MARYLAND.

SWIVEL-SNARE TRIGGER.

Application filed May 16, 1927. Serial No. 191,871.

This invention relates to a trigger which is adapted to be used in connection with snare lines, and its object is to provide a device of this kind which is sensitive in action and in which the parts are swiveled together so as to prevent twisting and knotting of the snare line after the animal is caught therein.

The invention is illustrated in the accompanying drawings forming a part hereof, and in which:

Figure 1 illustrates a snare with my improved trigger device employed therein;

Figure 2 is a perspective view of the trigger device; and

Figure 3 is a longitudinal section of the device as shown in Fig. 2.

Referring to the drawings in detail, 10 represents a flexible member of any desired character, such as a rod or pole, which is adapted to be bent down in forming the snare. To this rod or pole the upper end of the snare line 11 is attached and at its lower end this line is attached to the upper member 12 of my improved trigger device. The lower member 13 of this trigger device has attached thereto the lower part 14 of the snare line, this part of the line being formed into a loop 14$^a$ in which the animal is adapted to be caught. The snare line is held down in the usual manner as by means of a stake 15 driven into the ground or secured in any desired way, this stake being provided with a laterally projecting portion 15$^a$ beneath which the trigger is adapted to engage when the snare is set.

My improved trigger device, as before noted, includes the upper member 12 and the lower member 13. These members are swivelly connected in the following manner:

The upper member is provided with a laterally extending or angular portion 12$^a$ having an opening 12$^b$. The lower member 13 is loosely mounted in this opening, that is, the opening is larger than the body of the member 13. At its upper end the member 13 is provided with a head or enlargement 13$^a$ which is larger than the opening 12$^b$. At its lower end the member 13 is preferably provided with a flattened or enlarged portion 13$^b$ which is also larger than the opening 12$^b$ in the upper member. The upper and lower members of the trigger are preferably provided with openings 12$^c$ and 13$^c$ by which the lines 11 and 14 may be conveniently attached to the parts of the trigger.

I have found that a trigger of this kind is very sensitive, due to the fact that any lateral pull on the lower end of the member 13, as by an animal seeking to pass through the loop 14$^a$, will tilt the member 13 and this will serve to disengage the trigger from the stake 15, as such tilting of the member 13 with reference to the member 12 acts as a sort of pry or lever to disengage the trigger from the stake so that less force is required to disengage the trigger than if the parts 12 and 13 were made in one solid piece. Furthermore, the member 13 can rotate or swivel with reference to the member 12 so that after an animal is caught in the loop 14$^a$ and lifted from the ground, the movements of the animal will not tend to twist and knot the portions 11 and 14 of the line.

Various changes may, of course, be made in the details of this structure without departing from the invention as set forth in the appended claims.

Having thus described the invention, what is claimed as new and desired to be secured by Letters Patent is:

1. A snare device comprising a snare line having an upper portion and a lower portion with a snare trigger inserted between said portions, said snare trigger including an upper member connected to said upper portion of the line and a lower member connected to said lower portion of the line, said members being swivelly connected and said upper member having a laterally extending portion thereon adapted to engage beneath a holding device.

2. A snare trigger comprising an upper member having a laterally extending part thereon provided with an opening, a lower member loosely mounted in said opening and having a head on its upper end larger than said opening, and means on the upper end of said upper member and on the lower end of the lower member for attaching a snare line thereto.

3. A snare trigger comprising an upper member having a laterally extending part thereon provided with an opening, and a lower member loosely mounted in said opening and having a head thereon larger than said opening, said head being arranged above said laterally extending part on the upper member.

4. A snare trigger comprising an upper member provided adjacent its lower end with a laterally extending portion having an opening therein, a lower member loosely mounted in said opening and having a head arranged above said laterally extending portion, said lower member also having an enlarged portion thereon below said laterally extending portion of the upper member substantially as described.

In testimony whereof I hereunto affix my signature.

FRANCIS SNOWDEN PENN.